Jan. 10, 1967  E. E. EUREY ETAL  3,296,650
CASTER
Original Filed May 28, 1963  2 Sheets-Sheet 1
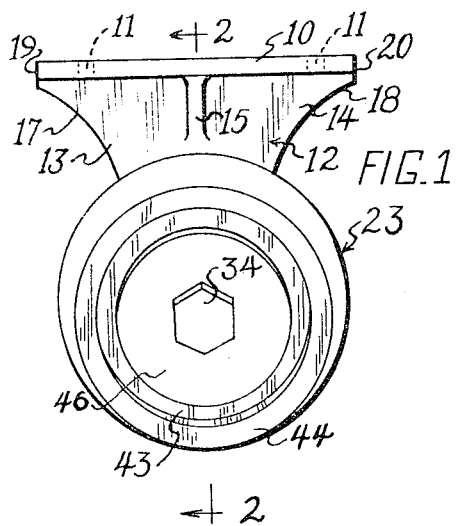
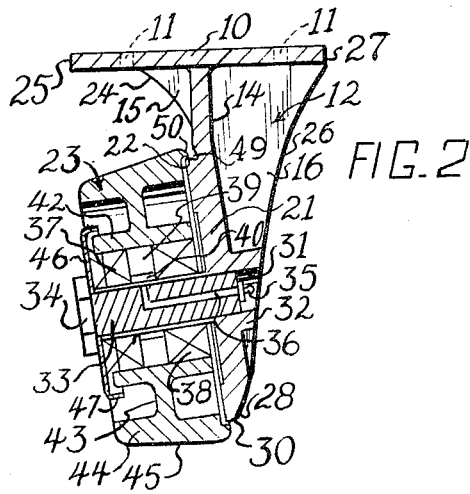
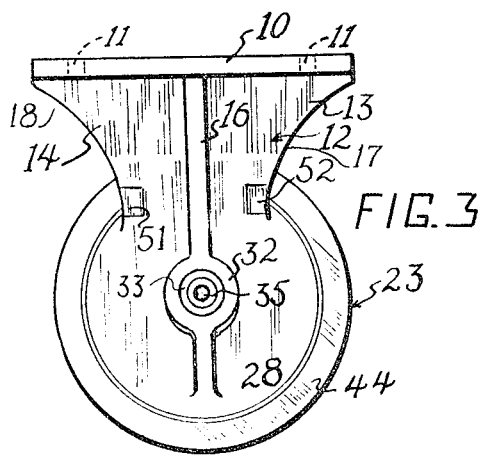
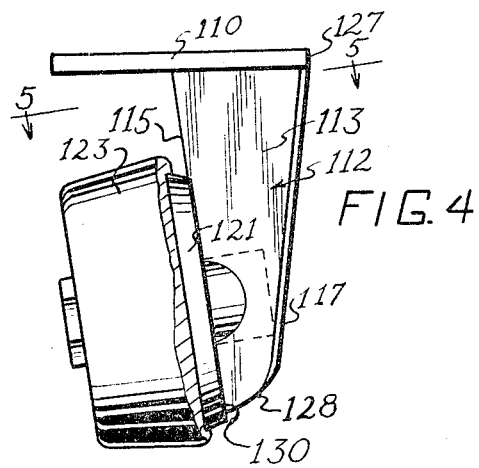
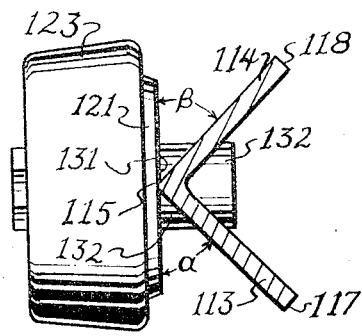
INVENTORS.
Edward E. Eurey
BY Edward M. Eurey
Newton, Hopkins & Jones
ATTORNEYS United States Patent Office 3,296,650
Patented Jan. 10, 1967

3,296,650
CASTER
Edward E. Eurey, 2128 Harper St., Newberry, S.C. 29108, and Edward M. Eurey, 2339 Chestnut Drive, Doraville, Ga. 30040
Continuation of application Ser. No. 283,748, May 28, 1963. This application Oct. 23, 1965, Ser. No. 511,273
11 Claims. (Cl. 16—18)

This invention relates to a caster and is more particularly concerned with a caster for use on a dolly or wagon in a textile mill.

This application is a continuation of application Serial No. 283,748, filed May 28, 1963, for "Caster."

The wagon for carting yarn and other material about a textile mill is usually mounted on casters and the wheels or axles thereof often pick up thread, lint or other material from the floor and carry it around the wheel so that it often encircles the axle and is wrapped tightly thereon so as to choke or otherwise impair the proper functioning of the caster.

In the past, many efforts have been made to obviate this difficulty encountered in textile mills. Such efforts usually involve the provision of a shield adjacent the inner surface of the caster wheel, the shield being for the purpose of preventing the lint or yarn, when wound around the shaft of the caster, from interfering with the rotation of the wheel. When a large amount of yarn has been collected on the caster shaft, the truck is usually taken out of service and the caster wheel removed from its shaft before the yarn may be removed from the caster. In some instances, the yarn may be manually cut from the shaft without removing the wheel, however, this is a most difficult operation. Little or no effort, to our knowledge, has been devoted to the design of the body, standard, or support so as to eliminate the likelihood of the yarn being wrapped around a shield or the shaft in the first place.

Briefly, the present invention provides a caster which has the body of the caster so constructed as to deflect a portion or all of the yarn from collection on the shaft of the caster and so as to shed this yarn or a major portion thereof. In general terms, the caster includes a wheel or inclined shaft, the shaft being carried by one end by the body of the caster in downwardly spaced relationship to the base member of the caster. The body of the caster includes a relatively large shield which is secured or integrally formed with the body throughout its major diameter so as to eliminate any small diameter portion between the roller and the caster body. Further, the caster body is downwardly tapered so as to prevent the accumulation of the yarn on the body portion and is provided with grooved or recessed portions whereby the yarn, if accumulated on the body of the caster, may extend across the recessed portion so that it may be readily accessible for the severing thereof.

Accordingly, it is an object of the present invention to provide a caster which will limit the amount of yarn picked up on the wheel and retained by the caster.

Another object of the present invention is to provide a caster in which if yarn is picked up by the wheel, there is little likelihood of the yarn being wrapped around the body or otherwise retained on the body of the caster.

Another object of the present invention is to provide a caster in which if any large mass of lint is picked up by the wheel, it will be sloughed off during rotation of the wheel.

Another object of the present invention is to provide a caster in which there are no small diameter portions which tend to collect yarn or lint.

Another object of the present invention is to provide a caster in which the shaft of the caster is protected from the collection of yarn and lint.

Another object of the present invention is to provide a caster which is inexpensive to manufacture, durable in structure, efficient in operation, and easy to clean.

Other objects, features and advantages of the present invention will become apparent from the following description when taken in conjunction with the accompanying drawings wherein like characters of reference designate corresponding parts throughout the several views and wherein:

FIG. 1 is a front elevational view of a caster constructed in accordance with the present invention.

FIG. 2 is a cross sectional view taken substantially along line 2—2 in FIG. 1.

FIG. 3 is a rear elevational view of the caster shown in FIGS. 1 and 2.

FIG. 4 is a partially broken away side elevational view of a modified form of caster constructed in accordance with the present invention.

FIG. 5 is a cross sectional view taken substantially along the line 5—5 in FIG. 4.

Figure 6:
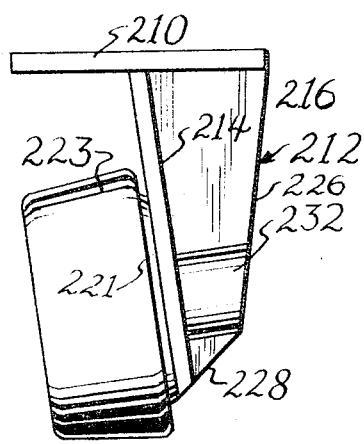
FIG. 6 is a side elevational view of a still further modified form of caster constructed in accordance with the present invention.

Referring now in detail to the embodiments chosen for the purpose of illustrating the present invention, it being understood that, in its broader aspects, the present invention is not limited to the exact details herein depicted, numeral 10 denotes generally the base member or platform of the caster shown in FIGS. 1, 2 and 3. The base platform 10 is preferably rectangular in shape and is flat on its upper surface and its lower surface being provided with appropriate holes 11 through which bolts or screws (not shown) may pass to secure the caster to the bottom surface of a wagon or cart (not shown).

Extending downwardly from the lower surface of the base platform 10 is a horn, standard, bracket, or support member which forms the body of the caster, denoted generally by numeral 12. In the present embodiment, depicted in FIGS. 1, 2, and 3, the body 12, adjacent the platform 10, is T-shaped in cross section to provide a laterally extending plate including a pair of opposed, oppositely extending, side flanges 13 and 14, and a transversely extending plate intersecting the laterally extending plate, the transversely extending plate including a front flange 15 and a rear flange 16 being diametrically opposed to each other. The flanges 13, 14, 15 and 16 are integrally joined at the major axis of body 10, along a common inner edge. From an examination of FIGS. 1, 2 and 3, it will be seen that each flange 13, 14, 15, and 16 is a flat member having an upper edge which abuts and is integrally joined to the lower surface of the base platform 10. The outer edges 17 and 18 of the side flanges 13 and 14, respectively, at their upper extremities merge with the opposite sides 19 and 20 of base platform 10 and converge downwardly in arcuate or concaved paths toward the central portion of the horn 12.

Connected to the lower portion of the horn 12 is a forwardly protruding circular disk or shield member 21 which is integrally formed with the lower portion of horn 12, being connected along its upper rear arcuate portion to the lower portion of the opposed side flanges 12 and 13. Thus is provided a waist portion along the central part of body 12 between disk 21 and the upper portion of body 12, the waist portion being of substantially reduced width with respect to the base platform 10. From an examination of FIG. 2, it will be seen that the disk 21 is provided along its front surface with a forwardly protruding annular shoulder 22 of substantially the same diameter as the diameter of disk 21, the disk 21 and the shoulder 22 forming a shield for the protection of the roller 23, as will be described in more detail later. The lower portions of flanges 13 and 14 are parallel to and spaced rearwardly from the annular shoulder 22 by the disk 21, while the upper portions of flanges 13 and 14 are essentially perpendicular or normal to the plane of the base platform 10. Therefore the plane of disk 21, intersects the plane of the platform 10 at an acute angle of slightly less than 90° so that the front surfaces of disk 21 and the annular shoulder 22 face outwardly and downwardly to a slight extent.

It is now seen that the back portion of disk 21 throughout its diameter, is integrally joined to the horn 12, i.e. flanges 13 and 14, while the periphery of disk 21 and shoulder 22 tapers inwardly, as seen in FIG. 2. Thus, at least the horn 12 and the disk 21 are joined at a recessed portion 49 adjacent the upper arcuate portion of disk 21, and the junction extends downwardly an appreciable distance to the lower tip or point 30.

It will be seen in FIG. 3 that the outer edges 17 and 18 of flanges 13 and 14 are sharpened, i.e. provided with knife edges 51 and 52 adjacent the upper portion of disk 21 so that any yarn collecting around the waist portion will be easily severed if any force is exerted on the yarn.

The front flange 15 is provided with an outer concaved or arcuate edge 24 which commences inwardly of the front edge 25 of platform 10 and curves rearwardly and downwardly so as to merge with the junction of the front flanges 13 and 14 immediately above the uppermost peripheral portion of the shoulder 22, the lower extremity of the edge 24 also merging with the front surface of the disk 21. The rear edge 26 of rear flange 16 extends from the rear edge 27 of platform 10 in a concaved arcuate path downwardly and forwardly merges, at its lower extremity, with the upwardly curved lower edge 28 of the back surface of disk 21. Thus, as viewed in FIG. 2 in cross section or from one side, the body 12 and shoulder 22 taper to a point 30 at the lower extremity of shoulder 22. As viewed from the front in FIG. 1, or back in FIG. 3, the body 12, has a lower rounded portion concentric with the disk 21, a central smaller waist portion defined by the junction of disk 21 and the flanges 13 and 14, and an upper outwardly flaring portion defined by the side flanges 13 and 14.

The central portion of disk 21 is provided with a bore or hole 31 which has an axis extending normal to the front surface of shoulder 22 and the front surface of disk 21. A cylindrical boss or sleeve 32 formed integrally with the back surfaces of flanges 13 and 14 and an intermediate portion of the rear flange 16, provides a reinforcing sleeve 32 which extends the effective length of the hole 31. As viewed in FIG. 2, the rear edge of the boss 32 terminates at the rear edge 26 of rear flange 16.

The hole 31 is provided with internal threads which threadedly receive the external threads at the inner end portion of a stub shaft or bolt 33, the shaft 33 protruding beyond the front surface of disk 21 and being provided at its outer or forward extremity with a widened flat circular head provided with an outwardly protruding teat 35 for the receipt of a greasing nozzle (not shown) communicating with the teat 35 is a passageway 36, the passageway 36 bending outwardly in the central portion of the bolt 33.

Received on the shank of bolt 33 between the front surface of disk 21 and the head 34 are a pair of roller bearings i.e. ball bearings, needle bearings or the like, designated by numerals 37 and 38 which are spaced apart by a sleeve 39, the sleeve 39 being provided with an annular groove 40 along its inner surface. The passageway 36 communicates with the annular groove 40 while the sleeve 39 is provided with one or a plurality of passageways which protrude from the annular groove 40 outwardly so as to conduct any grease or oil introduced through passageway 36 into the annular groove 40, outwardly through the passageways in sleeve 39 and between the roller bearings 37 and 38.

The roller or wheel 23 is provided with a central cylindrical hub 42 which is press fitted on and carried by the roller bearings 37 and 38, the hub 42 having a central radial flange 43 which protrudes outwardly from its central surface and carries the rim 44 of the roller 23, the rim 44 being provided with an outwardly tapered frustroconical surface or periphery 45, the tape of which is such that the lower portion of surface 45 of rim 44 is essentially parallel to the plane of platform 10, as this surface 45 engages the ground. Of course, the upper portion of surface 45 diverges forwardly from the plane of platform 10 and therefore also diverges from the front edge 24 of front flange 15, the front flange 15 overlying the inner portion of roller 23.

Between the head 34 and the hub 42 is a flat circular front shield which is provided, at its periphery, with an inwardly turned annular flange 47. The flange 47 overlapping the forward portion of hub 42. The front shield 46, of course, is provided with a central opening through which the bolt 33 protrudes. Thus, the front shield 46 prevents dirt, dust, lint and the like from entering bearings 37 and 38.

Adjacent rim 44, the inner face of roller 23 is recessed so as to provide an annular ledge 50 which overlaps the peripheral outer edge of shoulder 22, the recessed inner surface of the rim 44 therefore abuts or is in very close proximity to the shoulder 22 so that any lint or dirt picked up by the surface 45 will be precluded from passing between the ledge 50 and the shoulder 22, the ledge 50 being essentially concentric with the shoulder 22.

Referring to FIGS. 4 and 5 of the drawings it will be seen that the modified form of the present invention, as illustrated therein, includes a flat rectangular platform 110 from which downwardly extends a body 112. The body 112 is formed from angle flanges having a pair of right angularly disposed flanges 113 and 114, the flanges being joined along a common edge 115.

The flanges 113 and 114 are complementary and are provided with rear edges 117 and 118 which taper downwardly toward each other and toward the front edge 115. It will be seen in FIG. 4 that the upper extremity of the edges such as edge 117 terminates at the back edge 127 of platform 110. The edges 117 and 118 are straight and parallel to each other, being curved inwardly and downwardly, as at numeral 128, so as to come to a point 130 with the front edge 115.

From an examination of FIG. 4 it will be seen that the body 112 is connected along its upper surface to the platform 110 in such a manner that the common front edge 115 extends downwardly and rearwardly while the rear edges 117 and 118 extend downwardly and forwardly. Secured, as by welds 131 and 132, to the edge 115 is a flat circular disk 121, the edge 115 being disposed diametrically with respect to the disk 121 such that the front and rear surfaces of the disk 121 are essentially parallel to the edge 115. It will be understood from an examination of FIG. 5 that the angles $\alpha$ subtended between the rear surface of disk 121 and the flange 113 is approximately 45 degrees, while the angle $\beta$ subtended between the rear surface of disk 121 and the flange 114 is also approximately 45 degrees.

The disk 121 terminates along its bottom portion at the point 130 of body 112 while the central portion of disk 121 is provided with a hole (not shown) through which the bolt, such as shown in the preceding embodiment, protrudes. This hole is reinforced by a cylindrical boss 132 which abuts the rear surface of the disk at its central portion and protrudes through an appropriate circular hole having a center lying on the edge 115, the boss 132 having an axis perpendicular to the edge 115. The roller 123 is essentially of the same construction as the roller of the embodiments as shown in FIGS. 1, 2 and 3 and it, therefore, requires no detailed description. Furthermore, the disk 121 cooperates with the roller 123 in the same manner that the disk 21 and its annular shoulder 22 cooperate with the roller 23.

Figure 7:
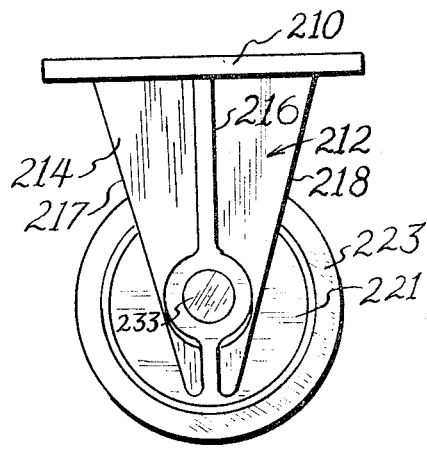
FIG. 7 is a rear elevational view of the caster shown in FIG. 6.

Referring now to FIGS. 6 and 7 of the drawings it is seen that the still further modified form of the present invention includes a rectangular platform 210 which is identical to the platform 10, a roller 223 which is identical to the roller 23, a disk 221 which is identical to the disk 21, the roller being carried by a shaft 233 which is identical to the shaft 33. The disk 221 is secured to the front surface of a downwardly and rearwardly extending flat triangular shaped flange 215 of the body 212, the flange being secured by its upper edge to the bottom surface of platform 210 and extending downwardly and rearwardly therefrom. The flange 214 is a flat member, the opposite edges 217 and 218 of which taper downwardly to a rounded lower end which terminates adjacent the plane of the lower edge of disk 221. The disk 221 is provided with a central opening (not shown) which is aligned with a central opening in the lower portion of the flange 214. Behind this opening is a boss 232 which is cylindrical in shape and is internally threaded for receiving the threaded end portion of a bolt 233 which is identical to the bolt 33. The axis of the opening which threadedly receives the shaft 233, as well as the axis of shaft 233 is perpendicular to the plane of the flange 214. Along the vertical axis of flange 214 is a back flange 216 having a back edge 226, the edge 226 being straight and extending forwardly and downwardly and merging with the edge of the boss 232. Immediately below the boss 232 the edge 226 extends inwardly and downwardly more sharply to define an edge 228 which merges with the lower edge of flange 214 and the disk 221.

Figure 8:
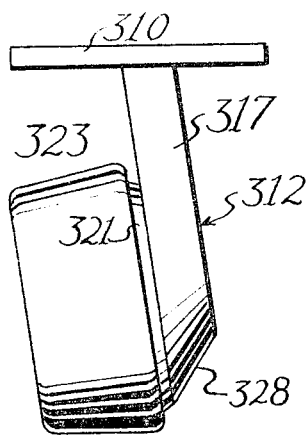
FIG. 8 is a side elevational view of still another modified form of caster constructed in accordance with the present invention.
Figure 9:
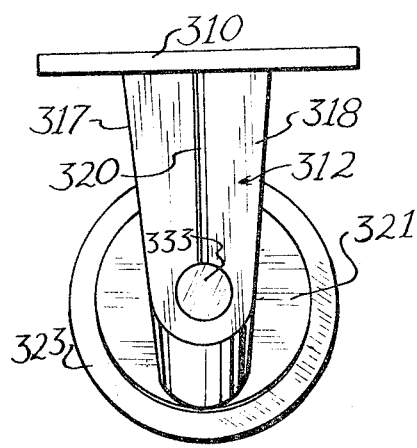
FIG. 9 is a rear elevational view of the caster shown in FIG. 8.

Still another modified form of the present invention is illustrated in FIGS. 8 and 9 wherein the rectangular platform 310 is essentially identical to platforms 10, 110 and 210. From the central portion of the platform 310, a rectangular body or standard 312 extends, the standard having straight opposed edges 317 and 318 and a flat front and rear surface. In this embodiment the edges 317 and 318 taper downwardly toward each other and the lower end of the standard, denoted by numeral 328 extends forwardly and downwardly, the sides 317 and 318 being rounded to merge with each other along a semi-cylindrical surface. The semi-cylindrical surface of standard 312 is provided with an axis which is disposed approximately 45 degrees to the main axis of the standard 312, the cylindrical portion tapering downwardly and forwardly with respect to standard 312. The disk 321 is adhered, (as by welding or the like) to the front surface of the standard 312 by welding or the like, the lower edge portion of the disk 321 terminating at the lower edge of the standard 312. The standard 312 is disposed with its axis in diametrical relationship to the disk 321 so that the entire vertical central portion of the disk 321 is contiguous with the front surface of the standard 312. The roller 323 is identical to the rollers of the preceding embodiments and is rotatably mounted on a shaft 333 in identical fashion to those heretofore described. In FIG. 9 it will be seen that the back surface of standard 312 is provided with a vertical groove 320 which is adapted to receive a knife (not shown) by means of which any yarn or lint may be readily cut from the standard 312.

From the foregoing description it will be seen that the various embodiments of the present invention have in common, a roller, such as the rollers 23, 123, 223 and 323, which are frustoconical members which taper forwardly (and downwardly) being carried on a shaft having an axis disposed perpendicular to the front edge or surface of a standard. The axis of the shaft extends downwardly and forwardly so as to dispose all such rollers with the lower surface parallel to the floor or other surface along which the caster travels. This lower surface, of course, is parallel to the platform, such as platform 10, 110, 210 and 310, from which the body, such as body 12, 112, 212 and 312 depend. The front surface of all bodies, such as body 12, 112, 212, and 312, and the disk such as disk 21, 121, 221 and 321, either merge or are contiguous throughout a diametrical portion of the disk while the periphery of the disk is slightly smaller than the inner diameter of the roller, the roller overlapping the disk to a limited extent as illustrated in FIG. 2.

The combination of the forwardly tapered roller and the rearwardly tapered shield or disk 121 which is carried by the body or standard of the caster, cooperate to render it unlikely that any yarn, fiber, lint, or the like will be wrapped around any portion of the caster. The tapered wheel tends to wind the yarn helically forwardly to direct the yarn outwardly so that it is sloughed off of the wheel while the relatively large diameter inwardly tapered disk prevents yarn from accumulating and tends to direct the yarn away from the roller.

If any yarn does collect on the casters of the present invention (and this is a rare occasion), such yarn tends to collect around the body of the caster at the waist portion thereof and hence must wrap around spaced edge portions such that the yarn, if collected, is suspended between two spaced elements so that it may be cut readily when it becomes necessary to remove the yarn. For this purpose, the embodiments of FIGS. 1 through 7 are more desirable than the embodiments shown in FIGS. 8 and 9. Since the body of each of the casters shown therein is downwardly tapered to an intermediate smaller waist portion. In the embodiment of FIG. 1, the front flange having its curved outer edge 24 cooperates with the roller 23 by directing the large lint portions, if the lint happens to be adhered to the roller.

The casters of the present invention are also readily greased when it becomes necessary by inserting grease in the passageways, such as passageway 36, into the interior of the hub of the roller 23. Such grease, however, does not readily dislodge itself from the roller since the front shield 46 prevents the grease from being discharged forwardly while the disk 21 prevents the grease from being discharged rearwardly. The overhanging ledge 50 and the annular shoulder 22 cooperate in preventing yarn or lint or dirt from entering the interior of the roller so as to become mixed with the grease or lodged between the roller 23 and the body 12.

It will also be observed that in all embodiments, the platform, such as platforms 10, 110, 210 and 310 are disposed over that portion of the roller 23, 123, 223 and 323 which engages the floor, supporting the caster. Thus, there is little tendency of the roller to pivot the caster in one direction or the other with respect to the wagon or cart to which it is attached.

The downwardly and outwardly directed shaft, such as bolt 33, 233 and 333, assure that the grease flows inwardly and that the roller is urged snugly at all times against the disk, such as disk 21, 121, 221 and 321, since the weight on the caster tends to shift the body 12, 112, 212 and 312, toward their associated rollers. While, preferably, the shafts or bolts, such as bolt 33, 233 and 333, should be disposed at approximately 5° to approximately 7½° downwardly from the horizontal or from the plane of its associated platform 10, 210 and 310, it will be understood that while a maximum of approximately 10° should be observed, the device is still operable up to approximately 15° inclined downwardly and indeed may be disposed horizontally, i.e. at a 0° inclination, if the benefit of the tapered wheel or roller is not desired.

It will be obvious to those skilled in the art that many variations may be made in the embodiments here chosen for the purpose of illustrating the present invention, without departing from the scope thereof as defined by the appended claims.

We claim:

1. A caster comprising a flat substantially rectangular base provided with holes through which screws may pass for securing said base to an object, a horn extending downwardly from said base, said horn having a pair of opposed side edges which taper downwardly and a front surface inclined inwardly and downwardly from the perpendicular with respect to said base, a disk secured to the lower portion of said front surface of said horn along the major diameter of said disk, a shaft disposed essentially perpendicular to said disk and extending forwardly therefrom, a roller rotatably mounted on said shaft, said roller having an inner face provided with an annular ledge concentric with and overlying the periphery of said disk, said roller having a conical periphery such that the lower surface of said periphery is essentially parallel to said base, a pair of spaced bearings mounted on said shaft and carrying said roller, and a spacer sleeve on said shaft between said bearings, said spacer sleeve being provided with an annular groove along its inside surface, said shaft being provided with a passageway from one end thereof inwardly, said passageway communicating with said annular groove, said sleeve being provided with an opening between said bearings and communicating with said annular groove.

2. In a caster of the type having a roller rotatably carried by a shaft, the combination therewith of a horn and a shield, said horn being characterized by a pair of flanges perpendicular to each other and joined along a common edge and having outer edges which converge downwardly, a circular shield secured along its diametrical portion to said common edge, said shaft projecting through the central portion of said shield and through the common edge of said flanges.

3. In a caster of the type having a horn which supports one end of a sidewise extending shaft and a roller rotatably mounted on said shaft, the combination therewith of a disk between said roller and said horn and recessed in one side of said roller, said disk being of slightly less diameter than said side of said roller and being fixed to said horn at the upper portion of said disk, said horn having a recess across which yarn passes when the yarn is picked up by said roller and retained by said horn, said recess being sufficiently wide to receive therein a portion of a blade for severing said yarn.

4. In a caster of the type having a roller mounted for rotation on a shaft and a horn carrying one end of said shaft, the combination therewith of a shield disposed between said roller and said horn, said shield forming a cover adjacent a portion of said roller for retarding the collection of lint and yarn around said shaft, said shield being secured to said horn adjacent its upper edge portion, said horn tapering downwardly toward said upper edge portion to form a waist portion, said horn being provided with a knife edge adjacent said waist portion for severing yarn collected at said waist portion by said knife edge upon force being applied to said yarn.

5. A caster including a body formed of flanges at substantially right angles, the longitudinal juncture of which defines a substantially upright surface and in which a shield is formed as a circular disc fixedly secured thereto, said body defining a substantially upright surface, a caster roller, one side of said caster roller being recessed to receive said shield, means for mounting said caster roller closely adjacent said substantially upright surface for rotation on a substantially perpendicular axis relative to said substantially upright surface and the shield between said surface and said caster roller, said shield consisting of an integral disc formed on said substantially upright surface and extending into the recess of said roller and being in sufficiently close proximity to said substantially upright surface as to preclude the entrance between said shield and surface of any appreciable amount of thread or lint therebetween and said shield being in sufficiently close proximity to said roller as to preclude the entrance between said shield and surface of any appreciable amount of thread or lint therebetween.

6. A caster including a body defining a substantially upright member having a mounting means thereon, a roller, means for mounting said roller closely adjacent said upright member for rotation about an axis that is substantially perpendicular to said upright member, and a generally circular shield between said upright member and said roller, said upright member being fixed to said shield and extending in adjacent relationship along a diameter of said shield substantially to its upper and lower boundaries, and having a face that is oppositely disposed from said roller that includes a smooth uninterrupted surface extending upwardly and away from the lower portion of said shield so as to guide any threads or lint that may become attached to said caster away from the juncture of said roller and said upright member, and said shield being in sufficiently close proximity to said roller so as to lie substantially along the plane of the inner face of said roller so as to preclude the entrance between said shield and said roller of any appreciable amount of thread or lint therebetween.

7. The caster as defined in claim 6 in which one side of the roller is recessed to receive said shield.

8. The caster as defined in claim 7 in which the shield consists of an integral disc formed on said substantially upright member and extending into the recess of said roller.

9. The caster defined in claim 6 in which said upright member has a recess across which yarn passes when the yarn is picked up by said roller and retained by said upright member, said recess being sufficiently wide to receive therein a portion of a blade for severing said yarn.

10. The caster as defined in claim 9 in which said upright member tapers downwardly to form a waist portion, said upright member being provided with a knife edge adjacent said waist portion for severing yarn collected at said waist portion by said knife edge upon force being applied to said yarn.

11. The caster as defined in claim 6 in which said means for mounting said roller comprises a shaft, a pair of spaced bearings mounted on said shaft and carrying said roller, and a spacer sleeve on said shaft between said bearings, said spacer sleeve being provided with an annular groove along its inside surface, said shaft being provided with a passageway from one end thereof inwardly, said passageway communicating with said annular groove, said sleeve being provided with an opening between said bearings and communicating with said annular groove.

References Cited by the Examiner

UNITED STATES PATENTS 2,742,663   4/1956   Meadows.

FOREIGN PATENTS 385,386   12/1932   Great Britain.

EDWARD C. ALLEN, *Primary Examiner.*

D. L. TROUTMAN, *Assistant Examiner.*